United States Patent [19]

Bowlby et al.

[11] 4,132,321
[45] Jan. 2, 1979

[54] PALLETIZER WITH CONTROLLED STACK DENSITY

[75] Inventors: Paul D. Bowlby; James M. Cinkoske, both of Indianapolis; Richard D. Harris, Shelbyville, all of Ind.

[73] Assignee: Economation, Inc., Indianapolis, Ind.

[21] Appl. No.: 795,091

[22] Filed: May 9, 1977

[51] Int. Cl.² .................................................. B65G 57/24
[52] U.S. Cl. ................................... 214/6 DK; 214/6 H
[58] Field of Search ............................ 214/6 DK, 6 H

[56] References Cited

U.S. PATENT DOCUMENTS

| 3,567,046 | 3/1971 | Reist | 214/6 H |
| 3,651,962 | 3/1972 | Arnemann | 214/6 DK |
| 3,698,572 | 10/1972 | Dahlem et al. | 214/6 H |
| 3,986,621 | 10/1976 | Bowser | 214/6 H |

*Primary Examiner*—Albert J. Makay
*Assistant Examiner*—Ross Weaver
*Attorney, Agent, or Firm*—Woodard, Weikart, Emhardt & Naughton

[57] ABSTRACT

Disclosed is a pallet loader in which each tier of a stack of flattened corrugated containers is placed on an extended, but horizontally retractable, stripping plate which when retracted drops the tier on a vertically movable elevator bed positioned below the stripping plate. The elevator bed then lowers until the path for horizontal extension of the stripping plate is cleared and the stripping plate then extends to receive the next tier. The apparatus differs from the prior art in that a control provides for an additional upward motion of the elevator for an adjustable time interval, thereby packing or pressing the just-lowered tier against the underside of the extended stripper plate, thereby reducing the "fluff" or looseness in the stacked tier.

2 Claims, 6 Drawing Figures

PALLETIZER WITH CONTROLLED STACK DENSITY

BACKGROUND OF THE INVENTION

Pallet loading devices of the general type referred to above are well known in the art. Examples are disclosed in U.S. Pat. Nos. 3,986,621, 3,856,158 and 3,624,782. Conventionally, these devices include an elevator raised and lowered to receive a stack of articles, such as flattened corrugated containers or the like. The operator manually places a predetermined number of articles on a stripping plate which extends over the upper terminus of the elevator's vertical path. As each tier of articles is completed, a switch is actuated to retract the stripping plate, dropping the tier on the elevator bed, if it is the initial tier, and atop the preceeding tier if it is the second or subsequent tier in the stack. The elevator then lowers until the stripping plate path is cleared and, to accommodate the inevitable inertia effect in lowering the elevator, moves upward slightly to return the top of the stack precisely to the stripping plate clearing position. The stripping plate then extends, and the operator places the next tier on the plate. When the selected number of tiers are in place on the stack, the elevator automatically descends to an extreme, lowered position and the stacked load is discharged to a receiving conveyor.

In boxboard plants, depending on the box manufacturing process, flattened boxes may tend to spring open, that is, resist assuming a flattened condition and the tendency to "fluff" or resist formation of a dense stack of boxes will vary with different runs, or orders, of boxes. The boxes are, in the box plant process, stacked into bundles and the bundles are placed on a pallet loading apparatus as described above and assembled into tiers.

Where each bundle or stack is individually strapped before it is tiered in the pallet loading apparatus, the bundles and stack are, of course, quite stable. Where, however, this strapping operation is omitted, the "fluff" or resistance to flattening in the stacked bundle makes the bundle unstable and when it is dropped, by retraction of the stripping plate, onto the underlying bundles, the instability of the load is compounded and toppling of the stack is the likely result, with attendant production delays.

The concept of the present invention alters the operation of the pallet loading apparatus to provide a timed upward movement of the elevator beyond the stripping plate clearing position and after extension of the stripping plate to thereby pack or compress the load on the elevator against the underside of the stripping plate thus eliminating excessive fluff from the stacked load. Stability of the load is greatly increased without the necessity of individually strapping each stack prior to placing it on the pallet loader stripping plate. The time interval during which the additional upward motion of the elevator occurs in adjustable so that the pallet loading apparatus can easily be adapted to provide a uniform desired tightness of the tiers, or stacked bundles, for runs or orders of boxes having differing fluff characteristics upon stacking.

DESCRIPTION OF THE PREFERRED EMBODIMENT

Figure 1:
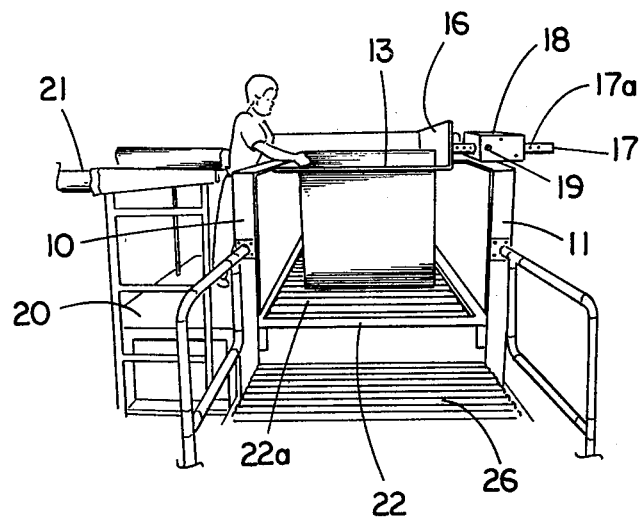
FIG. 1 is a front view of a pallet loader apparatus embodying the present invention and in operation.
Figure 2:
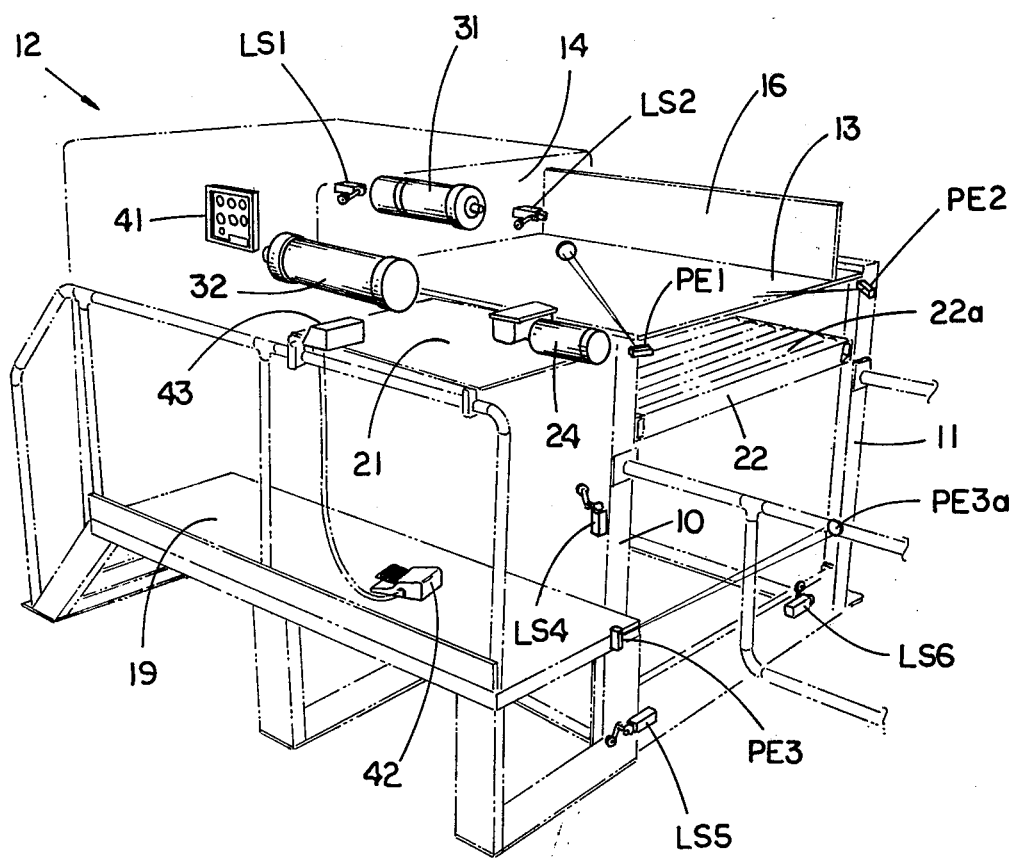
FIG. 2 is a perspective view of the apparatus in FIG. 1, with the structural elements themselves shown in phantom lines and the pertinent electrical components shown in solid lines.

Referring to FIGS. 1 and 2, the pallet loading apparatus may be seen to include side members 10 and 11, the space between the members to the rear of the structure providing a housing 12 (FIG. 2) accommodating the stripping plate 13 when it is retracted. A stationary backstop plate 14 forms the front of the housing and an adjustable backstop plate 16, closely overlying the stripping plate 13, defines the unobstructed area of the stripping plate.

As may best be seen in FIG. 1 the adjustable positioning of the backstop plate 16 may be accomplished by moving the apertured rod 17 which extends from the rear face of the plate 16 within upright plates 18, a pin 19 being inserted through registering apertures in the plates 18 and through the selected one of the aligned apertures 17a in the rod 17.

A platform 20 extends from the sidewall 10 and is occupied by the operator of the apparatus. In front of the operator, when occupying the platform, is a ball-top table 21 to which stacks of folded boxes may be transported by conveying apparatus not shown. The operator slides the stacks of boxes onto the stripper plate 13 as shown in FIG. 1, arranging them into a tier of the desired configuration defined by the position of the backstop plate 16. The stacked tiers rest upon a lift or elevator 22 which moves vertically within the space between the side members 10 and 11. The elevator bed is formed by a powered roller conveyor 22a. The roller conveyor is powered by the drive motor 24 (FIG. 2). When the elevator 22 reaches its full downward position, the conveyor 22a is actuated to move the load from the elevator onto the exit conveyor 26 (FIG. 1).

Referring now principally to FIG. 2, the elevator conveyor drive motor 24, previously mentioned, is shown together with down limit switches LS5 and LS6. A photoelectric sensing device PE3 cooperates with the opposed reflector PE3a. The sensing device PE3 senses that a load has exited from the elevator conveyor, powered by motor 24, and stops the motor 24 when the load has been delivered onto the conveyor 26 (FIG. 1).

Retraction and extension of the stripping plate 13 (shown in its extended position in FIGS. 1 and 2) is powered by the stripping plate drive motor 31. A limit switch LS1 senses the retracted position of the plate 13 and a limit switch LS2 mechanically senses the fully extended position of the plate 13. The upward and downward motion of the elevator 22 is powered by the elevator drive motor 32.

Disposed just under the stripping plate 13 are two photoelectric sensing devices PE1 and PE2, whose beams cross at approximately the center of the stripping plate, the photoelectric sensing devices cooperating with opposed reflectors as is conventional. The sensing devices PE1 and PE2 establish the upper limit of motion of the elevator 22 as will subsequently be explained. A control station 41 and a foot switch 42, together with an operator station 43 permit the operator standing on the platform 19, to control the operation of the apparatus.

In a normal cycle of operation, after the backstop 16 has been properly set, the operator actuates the controls so that the elevator 22 rises to a position just beneath the plane of motion of the stripping plate 13, the position being defined by the sensing devices PE1 and PE2. Waster sheets (not shown) are placed directly on the elevator rollers as shown in FIG. 1, the operator then actuates the proper switch to extend the stripper plate and slides the required number of stacks of flattened boxes onto the stripper plate until the tier is completed. He then actuates the controls so that the stripping plate 13 is retracted into the housing 12 permitting the tier of boxes to drop onto the elevator 22. By proper actuation of the controls the elevator is then caused to descend until the obstruction to the photoelectric sensing devices PE1 and PE2 is removed, that is, until the uppermost box clears the light beam emitted from PE1 and PE2. Because of inertia, on its downward movement the elevator will overshoot the proper position somewhat and the control circuit automatically actuates the motor 32 to raise the elevator until the sensing devices PE1 and PE2 again have their light beams obstructed by the upper surface of the tier of boxes on the conveyor 22a. In the meantime the stripping plate 13 has again been extended and the operator may then build another tier on the stripping plate and the cycle may be repeated. When the elevator 22 has been completely loaded, it may, by means of the control circuit, be dropped to its full down position and the load may be moved off the powered conveyor 22a onto the receiving conveyor 26 (FIG. 1).

Figure 3:
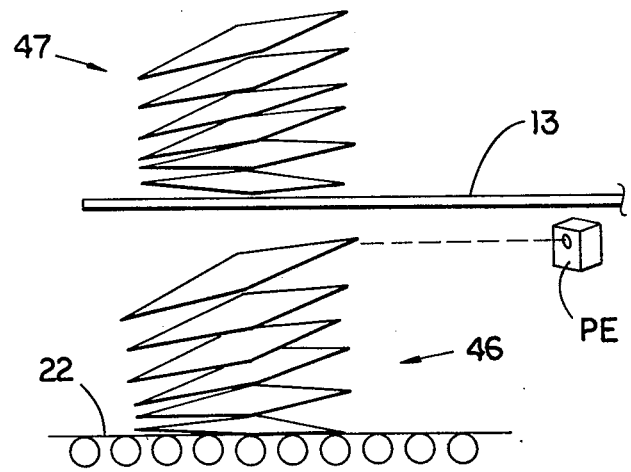
FIG. 3 is a fragmentary, schematic view illustrating loading conditions in the apparatus of FIGS. 1 and 2.

The sequence of operation just described is conventional and, in itself, does not form a part of the present invention. With this conventional sequence of operation, however, problems arise because of the "fluff" in each of the bundles or stacks of folded boxes as will be described with reference to FIGS. 3 and 4. In FIG. 3 there is schematically depicted the elevator or lift surface 22 upon which rests a stack of collapsed boxes 46 which has previously been deposited on the elevator 22 by retraction of the stripping plate 13 (shown in extended position in FIG. 3). The stack 46 has excessive "fluff" and the upper surface of the upper most box on the stack obstructs the beam of the photocell sensing device PE which represents, collectively, the sensing devices PE1 and PE2 of FIG. 2. The elevator surface 22 has lowered until the beam from sensing device PE is unobstructed and then has again raised until the beam is obstructed to overcome the inertia error previously mentioned.

Figure 4:
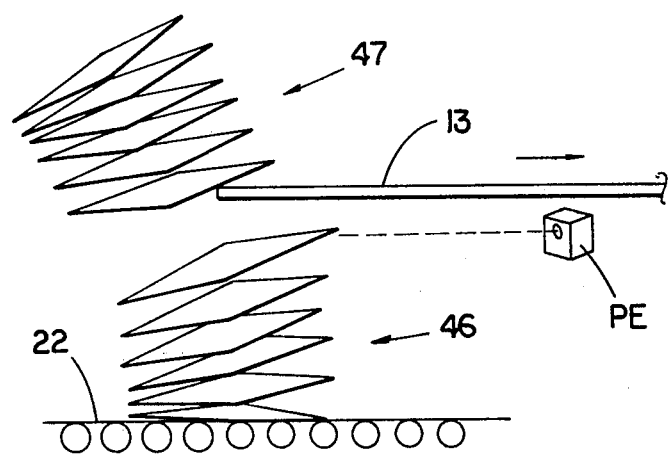
FIG. 4 is a schematic view similar to FIG. 3 but showing undesired loading conditions which occur further in the sequence of operation.

With the extension of the stripping plate 13 over the stack 46 the operator places a second bundle or tier, indicated at 47 on the stripping plate. This bundle also has substantial "fluff". As may be seen in FIG. 4, as the stripping plate 13 moves to retracted position, the somewhat unstable bundle 47 drops on and collapses the bundle 46 increasing the fall distance and compounding the instability of the bundles and tilting the composite stack, causing the bundles to slide and collapse sidewardly. Since the position of the bundle 46, after it has been lowered below the stripping plate, is established by obstruction of the sensing element beam from the element PE, none of the "fluff" is removed from the lowered stack prior to depositing the succeeding stack on it by withdrawal of the stripping plate. FIG. 3 and 4 thus illustrate the problem which the present invention solves.

Figure 5:
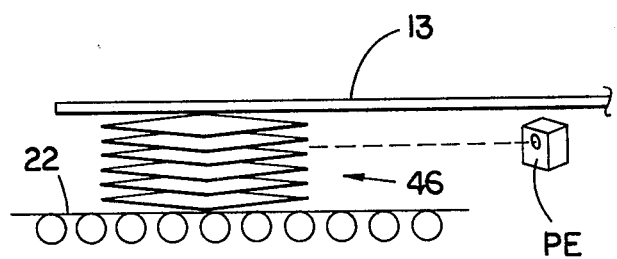
FIG. 5 is a schematic view similar to FIG. 4 but showing the operation of the apparatus improved by the additional upward motion of the elevator.

The difficulty illustrated in FIGS. 3 and 4 is eliminated by the action of the elevator when it embodies the concept of the present invention. Referring to FIG. 5, it will be noted that the elevator or lift 22 has moved upwardly beyond the position at which the beam from sensing device PE has been obstructed and the stack 46 has been compressed against the underside of the stripping plate 13. This additional upward movement of the elevator may be obtained in various ways but, as described with reference to FIG. 6, it is herein accomplished by delaying the halting of the upward motion producing energization of the elevator drive motor 32 (FIG. 2) after the beam of the sensing element has been obstructed. This delay time in deenergizing the upward directional energization of the elevator motor 32 can be adjusted to vary the degree of compression of the stack. With the stack compressed, as indicated in FIG. 5, the succeeding bundle 47 will fall a shorter distance and rest upon a more stable underlying stack when the stripping plate 13 is retracted. This introduction of a time delay in the upward motion of the elevator after the stripping plate has been extended provides a solution to the fluff problem.

Figure 6:
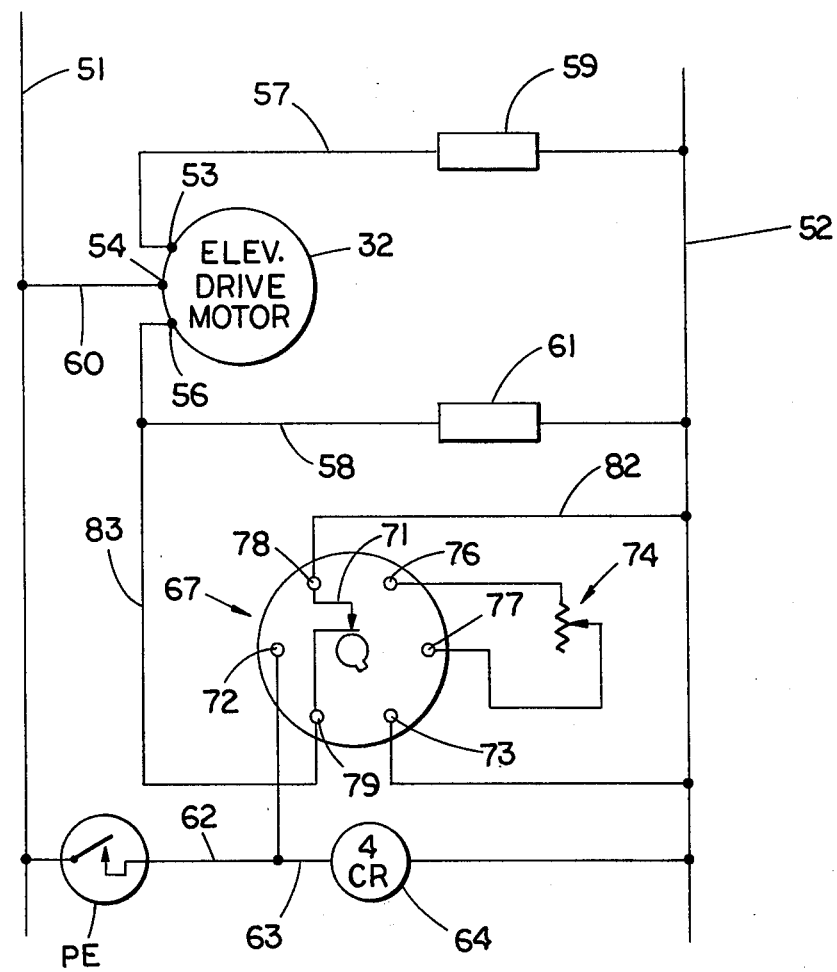
FIG. 6 is a schematic electrical wiring diagram showing a preferred means for providing the added upward motion of the elevator.

Referring to FIG. 6. the photoelectric sensing element PE, together with its amplifier is schematically shown interposed in a wire 62 connected to the power supply line 51. It will be understood that the photoelectric sensing element PE represents, collectively the sensing elements PE1 and PE2 of FIG. 2. A wire 63 is connected to the other power supply line 52 and interposed in it is a schematic showing of a control relay 64 which, it will be understood, is connected by circuit means not shown to the control circuit components schematically illustrated at 59 and 61. The relay 64 operates to provide the proper position sensing signal to the circuit components 59 and 61, its energization being dependent upon the closure of switch PE. The switch PE is normally open as shown and is closed when the light beams issuing from the sensing elements PE1 and PE2 are obstructed. The means for introducing a delay in the halting of the upward motion of the elevator preferably takes the form of a plug-in, solid state timer assembly indicated schematically at 67 in FIG. 6. This plug-in timer is of a type commerically available, utilizing solid state circuit components, and including a normally closed switch 71 which is opened upon a time interval after the imposing of electrical power across the terminals 72 and 73. The timed interval may be adjusted by means of a conventional potentiometer indicated generally at 74 which is remote from the solid state timer, the terminals 76 and 77 of the timer providing for connection of the potentiometer 74. The switch 71 is connected by means of terminals 78 and 79 to wires 82 and 83. The wire 52 provides a circuit to the wire 58 so that an auxiliary circuit to the elevator lift terminals 54 and 56 is provided, and as long as switch 71 is closed, through wire 82, switch 71, and wire 83 to terminal 56. A commercially available solid state timer 67 which has proved to be satisfactory in use in remotely adjustable plug-in timer model number 1017-P2-OP1 manufactured by Industrial Solid State Controls Inc. of York, Pennsylvania. The potentiometer 74 may be a standard 0.1 megohm potentiometer model number 800T-U49 manufactured by Allen-Bradley of Milwaukee, Wisconsin. The range of adjustment available for timing the delay in box plant operations is from 0.02 to 0.25 seconds and the proper setting is made by the operator at the control panel 41 (FIG. 2).

In operation, as the elevator moves the stack deposited on it toward the beam of the sensing elements PE (FIG. 5), the beam will be obstructed and the switch indicated at PE in FIG. 6 will be closed. Without the time delay of the present invention this would, by energizing relay 64, cause the control components, collectively indicated at 61, to halt the upward motion of the elevtor drive motor 32. However, although closure switch PE places power across the terminals 72 and 73 of the solid state timer 67, the switch 71 will not immediately be opened and a circuit will be maintained to the terminals 54 and 56 of the elevator drive motor. This circuit will be maintained for a short time interval, as determined by the potentiometer 74, and will cause the elevator to move upwardly beyond the beam-obstructing position as shown in FIG. 5 compacting the stacked load the desired amount against the underface of the stripping plate 13.

It will be understood that the circuit shown in FIG. 6 is simplified and schematic only and that other means might be utilized for obtaining the delay in the halting of the upward motion of the drive motor 32 after the stripping plate 13 has been extended. This delay in the halting of the elevator drive motor up-motion, however, is quite important in overcoming the difficulty illustrated with reference to FIGS. 3 and 4.

While the invention has been illustrated and described in detail in the drawings and foregoing description, the same is to be considered as illustrative and not restrictive in character, it being understood that only the preferred embodiment have been shown and described and that all changes and modifications that come within the spirit of the invention are described to be protected.

What is claimed:

1. In apparatus for stacking bundles of flattened corrugated containers or the like into unit-loads, the apparatus being of the type in which each tier of the stack is initially placed on an extended but horizontally retractable stripping plate which, when retracted, drops the tier on a vertically movable elevator bed disposed directly below the stripping plate, said apparatus including means for sensing the presence of the upper margin of the top tier of bundles on said elevator bed with the sensing means being disposed closely adjacent the underside of the stripping plate, and power means having a bed elevating and lowering mode controlled by said sensing means for lowering said elevator bed upon retraction of the stripper plate an amount sufficient to clear the upper margin of the top tier of bundles on the elevator bed with respect to said sensing means, the improvement comprising control means operable after the stripping plate is again extended for maintaining said power means in its bed elevating mode for a predetermined adjustable time interval to thereby compress the stacked bundles on the elevator bed against the underface of said stripper plate, said control means including a manually adjustable timer for determining said adjustable time interval.

2. The improved apparatus claimed in claim 1 further characterized by said control means placing said power means in elevating mode after extension of the stripping plate until said sensing means senses the presence of said top tier upper margin, and thereafter maintaining said power means in elevating mode for a predetermined, adjustable time increment, the length of said adjustable time interval thereby determining the degree of compression of the stacked bundles.

* * * * *